W. C. BUCKNAM.
PANTOGRAPHIC GAS CUTTING APPARATUS.
APPLICATION FILED OCT. 31, 1918.

1,333,899.

Patented Mar. 16, 1920.
3 SHEETS—SHEET 1.

INVENTOR
Worthy C. Bucknam
BY
J. P. Brandenburg
ATTORNEY

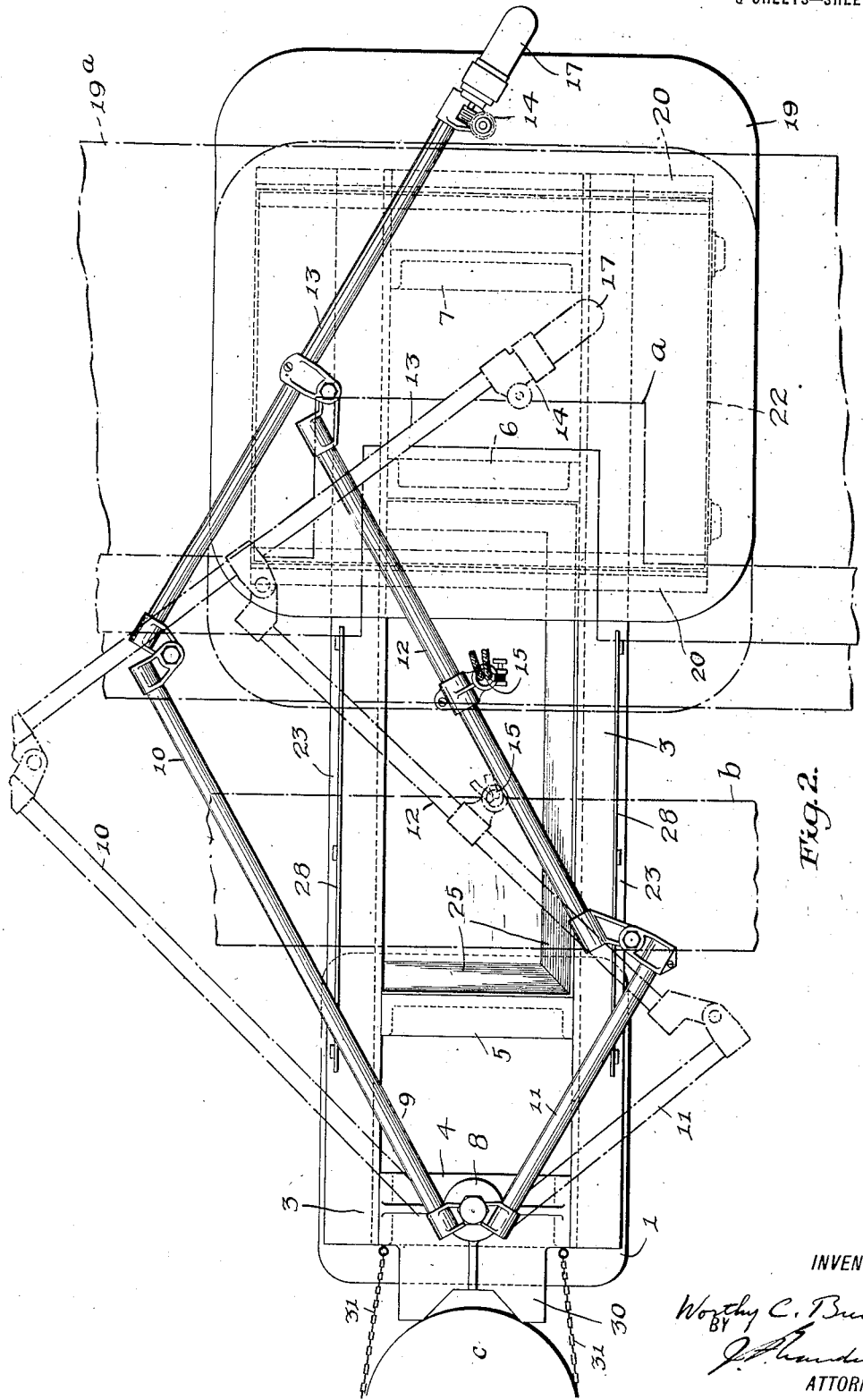

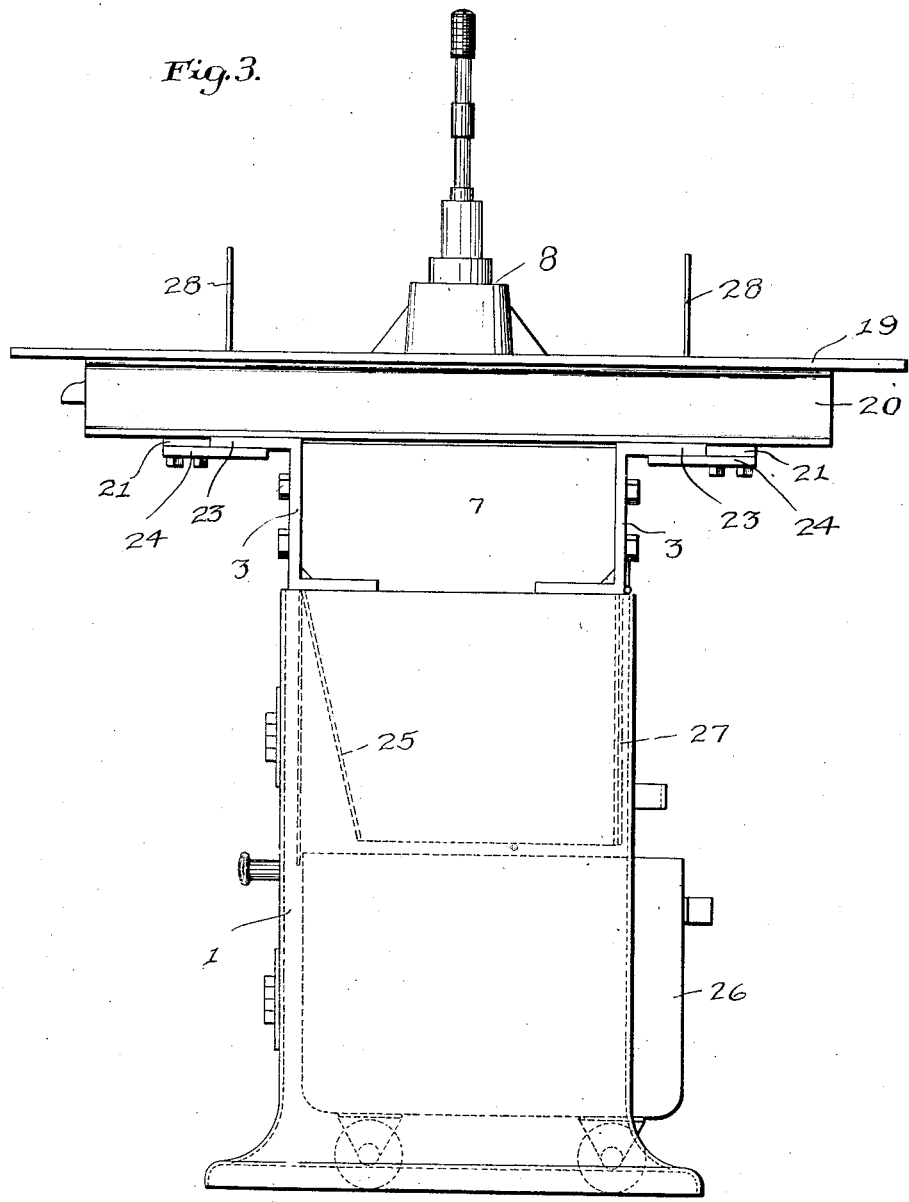

UNITED STATES PATENT OFFICE.

WORTHY C. BUCKNAM, OF JERSEY CITY, NEW JERSEY, ASSIGNOR TO DAVIS-BOURNONVILLE COMPANY, OF NEW YORK, N. Y., A CORPORATION OF NEW YORK.

PANTOGRAPHIC GAS-CUTTING APPARATUS.

1,333,899.     Specification of Letters Patent.     Patented Mar. 16, 1920.

Application filed October 31, 1918. Serial No. 260,461.

*To all whom it may concern:*

Be it known that I, WORTHY C. BUCKNAM, a citizen of the United States, and a resident of Jersey City, in the county of Hudson and State of New Jersey, have invented new and useful Pantographic Gas-Cutting Apparatus, of which the following is a specification.

The invention comprises improvements in pantographic gas-cutting apparatus such as disclosed in my Patent 1,059,329 of April 15, 1913. The present objects are to make possible a wide range of work, to enable the apparatus to be readily adjusted to cut particular shapes, to provide a supporting frame for the pantograph arm, pattern and work wherein great solidity and rigidity are obtained by a construction affording facilities for storage of parts and equipment and for retention and convenient removal of debris, and to secure certain other advantages which will become apparent as the specification proceeds.

In the accompanying drawings forming part hereof:

Fig. 2 is a plan view thereof, indicating shifted positions of the pattern table and pantograph arm in broken lines; and Fig. 3 is an end elevation.

Figure 1:
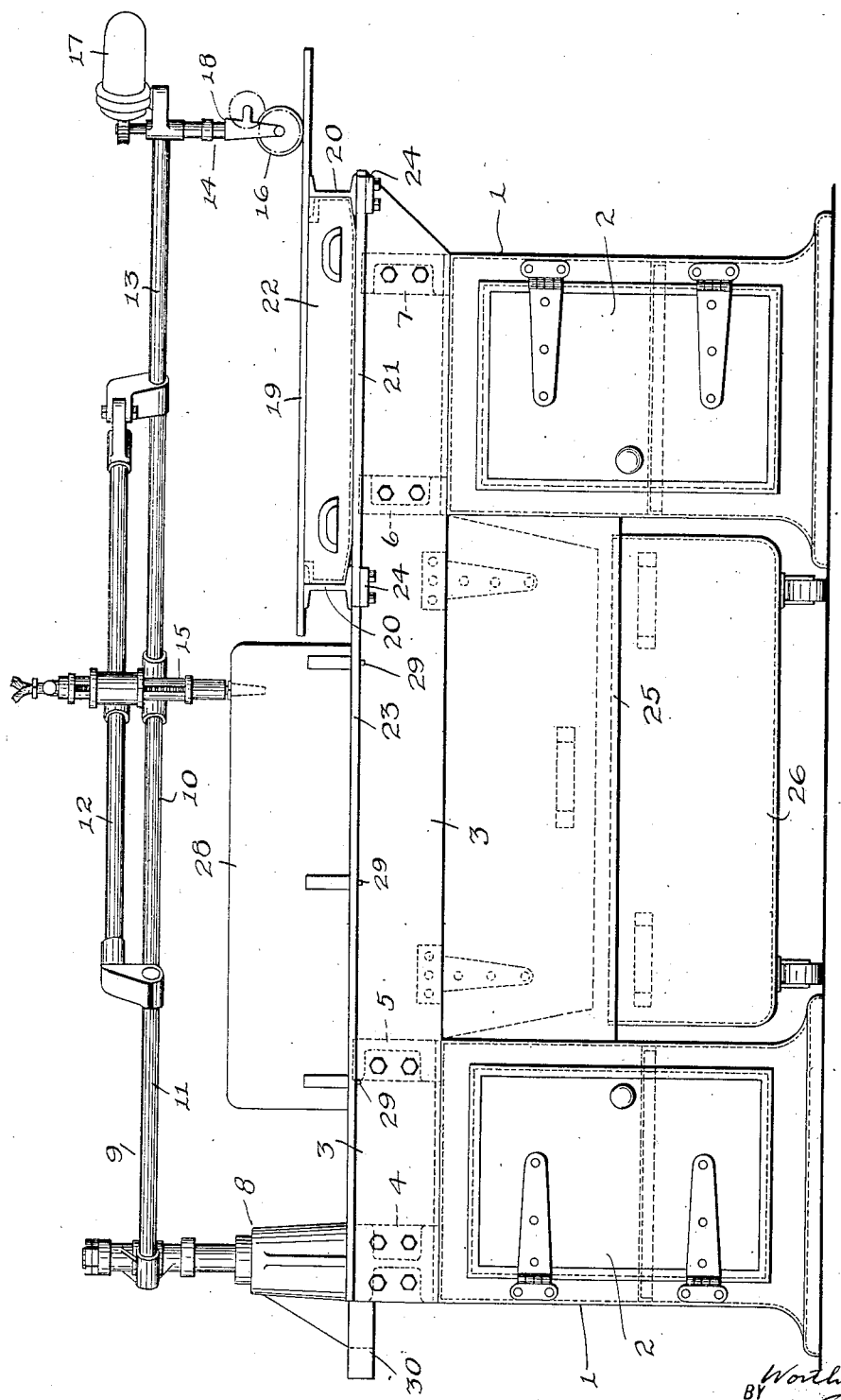
Figure 1 is a front elevation of the apparatus.

The machine has an elongate frame supported rigidly on two end pedestal cabinets 1, having doors 2. These pedestals are spanned by a pair of front and rear rails 3 bolted to spacers 4, 5, 6 and 7. The spacer 4 over the pedestal at one end is a relatively massive member, and carries an upright bearing post 8. On the latter is pivoted a long pantograph arm 9 comprising pivotally jointed parallelogram members 10, 11, 12 and 13, of which the member 13 is extended to bear a tracer 14, while the member 12 carries a cutting torch 15 of suitable character.

The tracer comprises preferably a single tracer wheel and rolling support 16, which is driven at uniform, variable speed, through suitable gearing, by an electric motor 17 fixed on the arm 13. The depending carrier 18 for the tracer is swiveled, to enable the tracer to be turned to travel in any direction.

The tracer operates over a plate 19 forming a pattern table at the part of the frame remote from the bearing post, while the torch is disposed over the open, intermediate part of the frame. The tracer driven by the motor is adapted to be guided along the outline of a pattern drawn upon a sheet placed on the table, and in so doing will cause the torch to execute a similar path of travel, thus cutting the desired design in a piece of metal supported on the open part of the frame.

The said pattern table is mounted slidably on the frame, so as to be shiftable toward or from the bearing post, for purposes which will presently appear. In the illustrated construction, the plate 19 is secured to a pair of bars 20 extending from front to rear, and further united at the bottom by longitudinal strips 21, the parts thus assembled being utilized to form the frame of a drawer 22. The inner edges of the strips 21 slidingly abut the outer edges of flanges 23 on the rails 3, and plates 24 bolted beneath the strips and engaging under the flanges prevent upward displacement.

A pit inclosure 25 extends downward from the open top of the intermediate part of the frame part way to the floor level, and the space beneath it and between the pedestal cabinets is occupied by a wheeled car 26 adapted to receive slag and fragments from the cutting operation. The rear wall of the pit inclosure is formed by a hinged door flap 27, which may be raised to permit the car to be withdrawn with a heaping cargo.

Plates 28 rising from the portions of the rails 3 at front and back of the pit opening are provided to retain sparks and to protect the operator. These plates are held in place by pins 29 on their lower edges, which enter sockets in the rails and permit the shields to be removed when the work is to extend beyond the rails or the pattern table is to be moved nearer the bearing post.

The provision for guided movement of the said table with reference to the post is of advantage in enabling the machine to be adapted for different kinds, sizes and shapes of work. The broken lines of Fig. 2 illustrate a case wherein the table has been shifted inward in order to enable the torch to cut a long blank, in this particular instance a crank shaft. In this way a greater extent of torch and tracer movement can be obtained transversely of the machine, than is obtainable lengthwise. The table is shown supplemented by an additional, transversely extending table top 19ª bearing a pattern $a$, and the piece of metal to be cut, also extending transversely, is indicated at $b$.

A notched block 30 on the end of the frame adjacent the bearing post affords a lateral rest, against which an oxygen tank $c$ may be held by chains 31.

What I claim as new is:

1. In pantographic gas-cutting apparatus, a frame comprising end pedestal cabinets, a top frame comprising longitudinal and transverse members supported by and uniting the cabinets and forming the top of a cutting pit between them, a post rising above one of the cabinets forming the fixed pivot of the pantograph, and a pattern table over the other cabinet.

2. In pantographic gas-cutting apparatus, a frame comprising end pedestal cabinets, a top frame comprising longitudinal and transverse members supported by and uniting the cabinets and forming the top of a cutting pit between them, a post rising above one of the cabinets forming the fixed pivot of the pantograph, the longitudinal members of the top frame forming guides, and a pattern table slidably engaged by the said guides over the other cabinet.

3. In pantographic gas-cutting apparatus, a frame comprising end pedestal cabinets, a top frame comprising longitudinal and transverse members supported by and uniting the cabinets and forming the top of a cutting pit between them, a post rising above one of the cabinets forming the fixed pivot of the pantograph, a hopper extending downward from the top frame between the cabinets, and a movable receptacle beneath the hopper forming the bottom of the cutting pit.

WORTHY C. BUCKNAM.